United States Patent
Gongle

(10) Patent No.: US 8,678,298 B2
(45) Date of Patent: Mar. 25, 2014

(54) COMPENSATION FOR SPOOL MOTION RELATED FUEL DELIVERY DRIFT OVER TIME IN A HYDRAULICALLY ACTUATED FUEL INJECTOR

(75) Inventor: Anup Vijaykumar Gongle, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 419 days.

(21) Appl. No.: 13/027,408

(22) Filed: Feb. 15, 2011

(65) Prior Publication Data

US 2012/0205461 A1   Aug. 16, 2012

(51) Int. Cl.
*F02D 1/06* (2006.01)
*F02D 7/00* (2006.01)

(52) U.S. Cl.
USPC ............ 239/5; 239/585.1; 239/900; 123/467; 123/490; 251/129.01; 701/104

(58) Field of Classification Search
USPC .............. 239/88–96, 585.1, 5; 123/445–490; 361/140–160; 701/103–115; 251/129.01
See application file for complete search history.

(56) References Cited

U.S. PATENT DOCUMENTS

| | | | | |
|---|---|---|---|---|
| 5,720,261 | A  * | 2/1998  | Sturman et al. | 123/446 |
| 6,966,040 | B2 * | 11/2005 | Ismailov | 703/2 |
| 7,216,630 | B2 * | 5/2007  | Martin et al. | 123/467 |
| 7,628,141 | B2 * | 12/2009 | Elie et al. | 123/490 |

* cited by examiner

*Primary Examiner* — Dinh Q Nguyen

(57) ABSTRACT

A method and system ensures that a certain amount of fuel is delivered by a fuel injector at each injection cycle over the life of the fuel injector. The injector has an armature that moves between open and close positions. A base time for the armature to move from the open position to the close position is established. A present time for the armature to move from the open position to the close position is compared to the base time. If the present time is greater than the base time by a predetermined amount, then 1) a present injector duration time is set to be greater than an original injector duration time to ensure that the certain amount of fuel is delivered by the fuel injector, or 2) a change in service condition is indicated for the fuel injector.

6 Claims, 4 Drawing Sheets

COMPENSATION FOR SPOOL MOTION RELATED FUEL DELIVERY DRIFT OVER TIME IN A HYDRAULICALLY ACTUATED FUEL INJECTOR

FIELD

This invention relates to hydraulically actuated fuel injectors and, more particularly, to a system and method to provide a correction factor to injection duration based on spool travel over injector life.

BACKGROUND

In hydraulically actuated fuel injection systems, a control valve body is provided with a valve system having grooves or orifices that allow fluid communication between working ports, high pressure ports, and venting ports of the control valve body of the fuel injector and the inlet area. The working fluid is typically engine oil or other types of suitable hydraulic fluid that is capable of providing a pressure within the fuel injector in order to begin the process of injecting fuel into the combustion chamber.

In current configurations, an injector driver circuit delivers a current or voltage to an open coil solenoid. The magnetic force generated in the open coil solenoid will shift an armature (spool) into the open position so as to align grooves of the control valve body with grooves in the armature. The alignment of the grooves permits the working fluid to flow into an intensifier chamber. This alignment is permitted for the requested duration of fuel injection, after which the injector driver circuit delivers a current/voltage to the close coil solenoid which shifts the armature to the close position and stops the fluid flow due to the grooves being misaligned. Injection duration is from the time the alignment of the grooves occurs in the open motion of the armature to the time the groove alignment is lost in the close motion of the armature.

Due to armature or spool surface wear and other magnetic effects, the armature motion from the open position to the close position becomes faster over injector operation time. This results in loss of grove alignment in the close motion of the armature earlier than expected, leading to lower injection duration which in turn results in lower fuel delivery than expected.

Thus, there is a need to compensate for the lost fuel delivery/engine power by ensuring that the full requested injection duration is achieved.

SUMMARY

An object of the invention is to fulfill the need referred to above. In accordance with the principles of the present invention, this objective is achieved by providing a method of ensuring that a certain amount of fuel is delivered by a fuel injector at each injection cycle over the life of the fuel injector. The fuel injector has an armature constructed and arranged to move between an open position and a close position. The method establishes a certain injection duration time of the fuel injector that ensures that a certain amount of fuel is delivered by the fuel injector. A base time (N) for the armature to move from the open position to the close position is established. A present time (N+1) for the armature to move from the open position to the close position is compared to the base time (N). If the present time is greater than the base time by a predetermined amount, then 1) a present injector duration time is set to be greater than the certain injector duration time to ensure that the certain amount of fuel is delivered by the fuel injector, or 2) a change in service condition for the fuel injector is indicated.

In accordance with another aspect of the invention, a control system for controlling motion of an armature of a fuel injector includes at least one fuel injector having an armature constructed and arranged to move between an open electromagnetic coil and a close electromagnetic coil. A controller is constructed and arranged to 1) actuate the fuel injector for a certain injection duration time to ensure that a certain amount of fuel is delivered by the fuel injector, 2) establish a base time (N) for the armature to move from the open coil to the close coil, 3) compare a present time (N+1) for the armature to move from the open coil to the close coil to the base time (N), and 4) if the present time is greater than the base time by a predetermined amount, then a) ensuring that a present injector duration time is greater than the certain injector duration time to ensure that the certain amount of fuel is delivered by the fuel injector, or b) indicating a change in service condition for the fuel injector.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
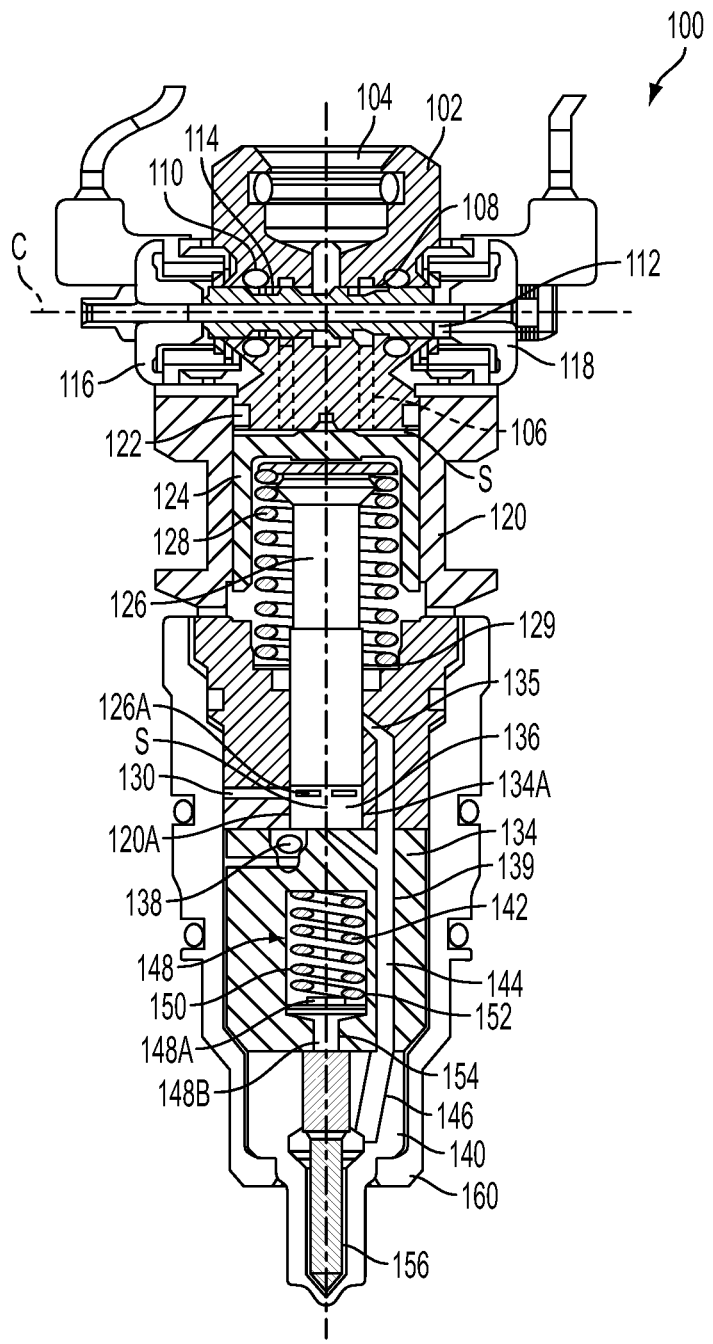
FIG. 1 shows an oil activated fuel injector provided in accordance with an embodiment of the present invention.

With reference to FIG. 1, an overview of a fuel injector in accordance with the invention is shown. It should be understood, though, that the injector shown in FIG. 1 is provided as one illustrative example, and that other configurations, features and the like may also be equally used with the invention. Accordingly, the fuel injector of FIG. 1 and the features described herein are not to be considered a limiting feature of the embodiment.

The fuel injector, generally indicated at 100, can be of the type disclosed in U.S. Patent Application Publication No. 2009/0139490 A1, the content of which is hereby incorporated by reference into this specification. The fuel injector 100 includes a control valve body 102 as well as an intensifier body 120 and a nozzle 140. The control valve body 102 includes an inlet area 104 which is in fluid communication with working ports 106. At least one groove or orifice (hereinafter referred to as grooves) 108 is positioned between and in fluid communication with the inlet area 104 and the working ports 106. At least one of vent hole 110 (and preferably two ore more) is located in the control body 102 which is in fluid communication with the working ports 106.

An armature 112, in the form of a spool, having at least one groove or orifice (hereinafter referred to as grooves) 114 is slidably mounted within the control valve body 102. An open coil 118 and a close coil 116 are positioned on opposing sides of the armature or spool 112 and are energized via a driver (not shown) to drive the armature 112 between a closed position and an open position. In the open position, the grooves 114 of the armature 112 are aligned with the grooves 108 of the valve control body 102 thus allowing the working fluid to flow between the inlet area 104 and the working ports 106 of the valve control body 102.

The intensifier body 120 is mounted to the valve control body 102 via any conventional mounting mechanism. A seal 122 (e.g., o-ring) may be positioned between the mounting surfaces of the intensifier body 120 and the valve control body 102. A piston 124 is slidably positioned within the intensifier body 120 and is in contact with an upper end of a plunger 126. An intensifier spring 128 surrounds a portion (e.g., shaft) of the plunger 126 and is further positioned between the piston 124 and a flange or shoulder 129 formed on an interior portion of the intensifier body 120. The intensifier spring 128 urges the piston 122 and the plunger 126 towards a first position proximate to the valve control body 102. A pressure release hole 130 is formed in the body of the intensifier body 120. The pressure release hole 130 may be further positioned adjacent the plunger 126.

As shown in FIG. 1, a check disk 134 may be positioned below the intensifier body 120 remote from the valve control body 102. The combination of an upper surface 134a of the check disk 134, an end portion 126a of the plunger 126 and an interior wall 120a of the intensifier body 120 forms the high pressure chamber 136. A fuel inlet check valve 138 is positioned within the check disk 134 and provides fluid communication between the high pressure chamber 136 and a fuel area (not shown). This fluid communication allows fuel to flow into the high pressure chamber 136 from the fuel area during an up-stroke of the plunger 126. The pressure release hole 130 is also in fluid communication with the high pressure chamber 136 when the plunger 126 is urged into the first position; however, fluid communication is interrupted when the plunger 126 is urged downwards towards the check disk 134. The check disk 134 also includes a fuel bore 139 in fluid communication with a fuel bore 135 in the intensifier body 120. The fuel bore 135 is in fluid communication with the high pressure chamber 136.

FIG. 1 further shows the nozzle 140 and a spring cage 142. The spring cage 142 is positioned between the nozzle 140 and the check disk 134, and includes a fuel bore 144 in fluid communication with the fuel bore 139 of the check disk 134. The spring cage 142 also includes a centrally located bore 148 having a first bore diameter 148a and a second smaller bore diameter 148b. A spring 150 and a spring seat 152 are positioned within the first bore diameter 148a of the spring cage 142, and a pin 154 is positioned within the second smaller bore diameter 148b. The nozzle 140 includes an angled bore 146 in alignment with the bore 139 of the spring cage 142. A needle 156 is preferably centrally located with the nozzle 140 and is urged downwards by the spring 150 (via the pin 154). A fuel chamber 152 surrounds the needle 150 and is in fluid communication with the bore 146. In embodiments, a nut 160 is threaded about the intensifier body 120, the check disk 134, the nozzle 140 and the spring cage 142.

With reference to FIG. 1, a control "C" is used to control and monitor different parameters of the injector 100. The control "C" may, for example, control, monitor and/or regulate the current provided to the open coil 118 and close coil 116. In this way, the control "C" can control, monitor and/or regulate the movement of the armature 112 between a closed position and an open position. The control C can be considered to be a controller that is preferably part of an engine control unit (not shown) of a vehicle. The controller can control all the fuel injectors of the vehicle.

Figure 2:
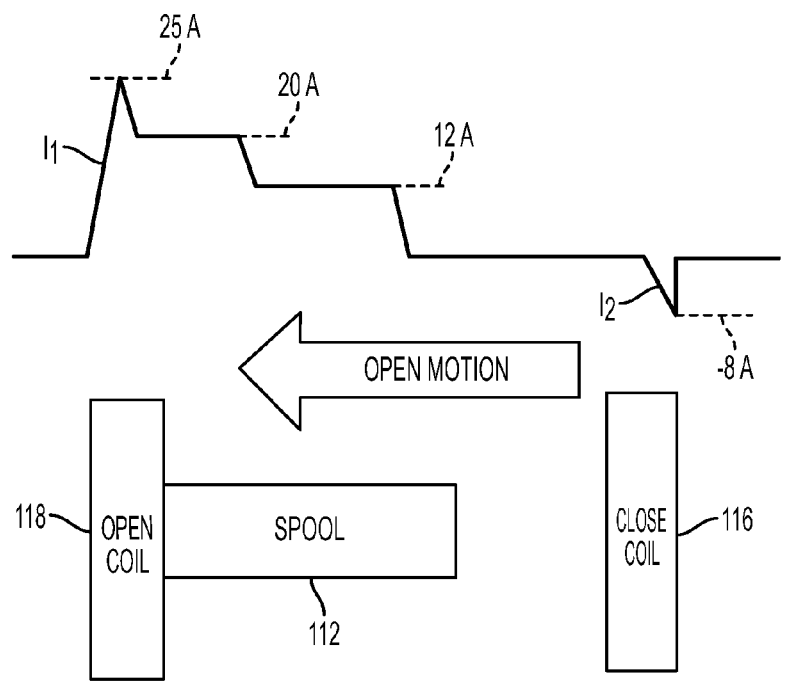
FIG. 2 is a schematic illustration of open motion of a spool of the fuel injector of FIG. 1.

The armature or spool 112 is parked at the close coil 116 (close position) before the start of injection. With reference to FIG. 2, when a start of injection signal is received, the armature or spool 112 starts moving towards the open coil 118 (open position). Positive current $I_1$ is applied to the open coil 118 to pull the spool 112 and negative current $I_2$ is applied to the close coil 116 to release the spool 112. Back electromagnetic force (EMF), can be monitored by the control "C". When the current changes in a coil, some energy must be transferred to or from the magnetic field generated by the coil. This energy transfer occurs by the magnetic field causing a voltage drop across the conductor while the current is changing. This voltage drop (back EMF) is proportional to the derivative of the current change over time, and the sign of the voltage will be such as to try to resist the change in current. Thus, closed loop operation is performed by measuring the voltage created by the motion of the armature or spool 112 as it is pulled from the negatively-energized coil (e.g., coil 116) to the positively energized coil (e.g., coil 118). Change in back EMF slope enables detection of the spool impact with the open coil 118, signaling open end of motion (OEOM). The spool 112 is then latched to the open coil 118 for the duration of injection (TI).

Figure 3:
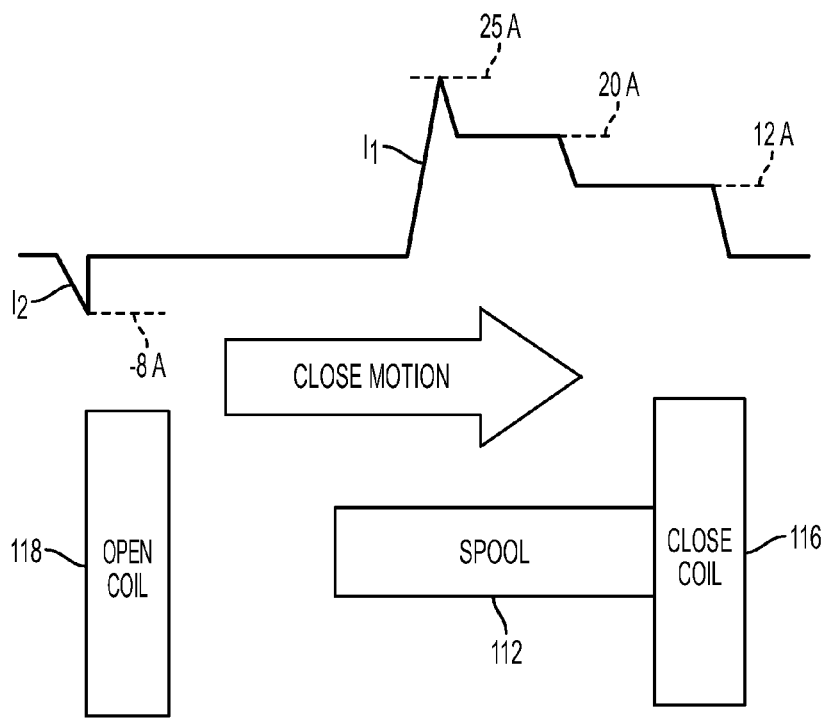
FIG. 3 is a schematic illustration of close motion of a spool of the fuel injector of FIG. 1.

With reference to FIG. 3, when an end of injection signal is received, the spool 112 starts moving to the close coil 116. Positive current $I_1$ is applied to the close coil 116 to pull the spool 112 and negative current $I_2$ is applied to the open coil 118 to release the spool 112. Back EMF is monitored by the control "C" and change in back EMF slope (see S1, S2 in FIG. 5) enables detection of the spool impact to the close coil 116, signaling the close end of motion (CEOM). The spool 112 is then latch to the close coil 116 until start of the next injection cycle.

Over time, due "wear-in" and other magnetic effects, the movement of the spool 112 from the open coil 118 to the close coil 116 becomes faster, resulting in a reduction of injection duration (TI) that causes a reduction of fuel delivery from a from the expected fuel delivery. In accordance with the embodiment, a spool drift compensation factor can be determined and applied to injection duration (TI). The compensation factor can be based on the difference in CEOM time, as will be explained more fully below. In addition, due to armature wear and other magnetic effects, the CEOM time of the armature 112 will reduce over the operating life thereof as compared to the CEOM time when the armature 112 is new. This fact can be used for detection of an injector change in service. The strategy has the capability to store the 'zero' hour measurement and the $N^{th}$ measurement as per the calibrated interval.

Figure 4:
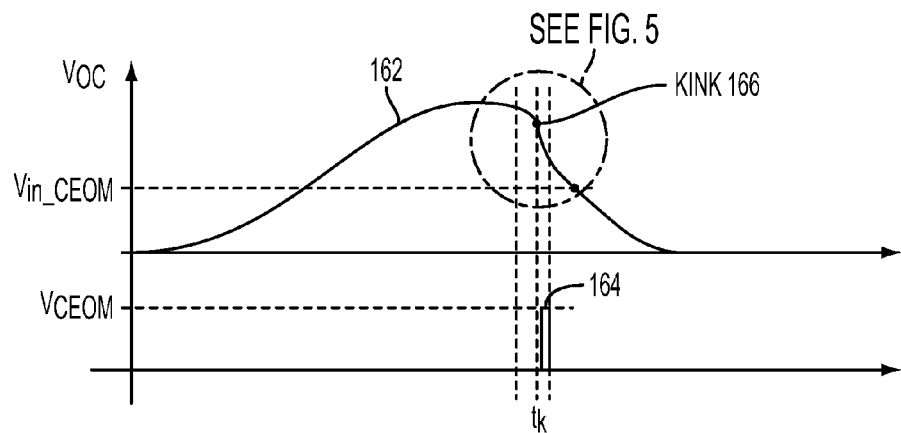
FIG. 4 is a graph of showing a close end of motion signal of a hydraulic fuel injector armature that is used by an engine control unit for calculating an injection duration correction factor in accordance with an embodiment of the invention.
Figure 5:
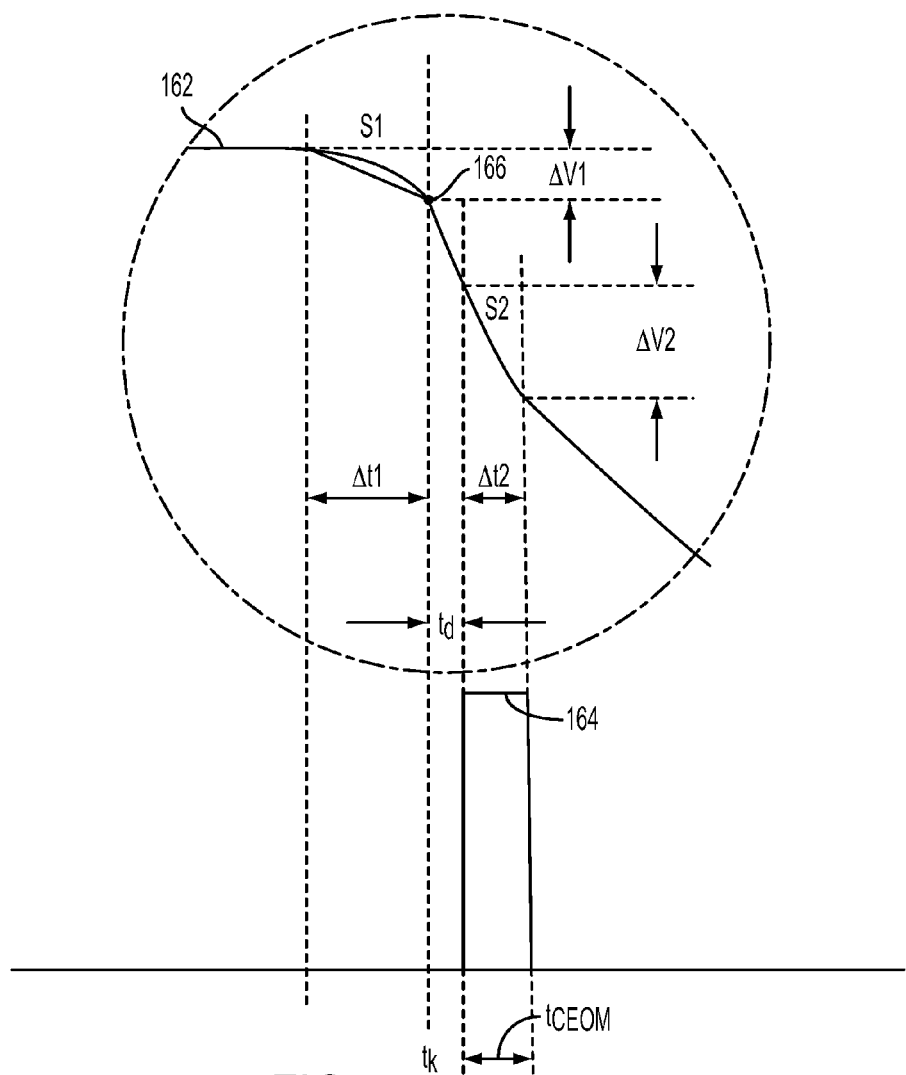
FIG. 5 is an enlarged view of the portion encircled at 5 in FIG. 2.

With reference to FIGS. 4 and 5, as mentioned above, the back EMF signal 162 is used to determine changes in CEOM times. The back EMF signal 162 at the open coil low side voltage during the close coil operation generates a Close End of Motion (CEOM) output signal 164. Signal 162 is induced during the close coil operation, when the armature 112 is moving to the close position. The CEOM output signal 164 is generated with a delay after the armature 112 has reached the close position.

The CEOM input signal 162 must fulfill two conditions in order to generate the CEOM output signal 164. First, the induced signal 162 must be greater than a threshold at the open coil low side pins. Second, the signal 162 must have a kink 166. The CEOM output signal 164 goes directly to the control unit's time processing unit (TPU) input, which is triggered on the rising edge of CEOM.

The control unit and control software should have the capability to measure the time for the detection of the CEOM output signal 164. The calculation of compensation factor applied to injection duration is based on the change in time for detection of the CEOM output signal 164.

Figure 6:
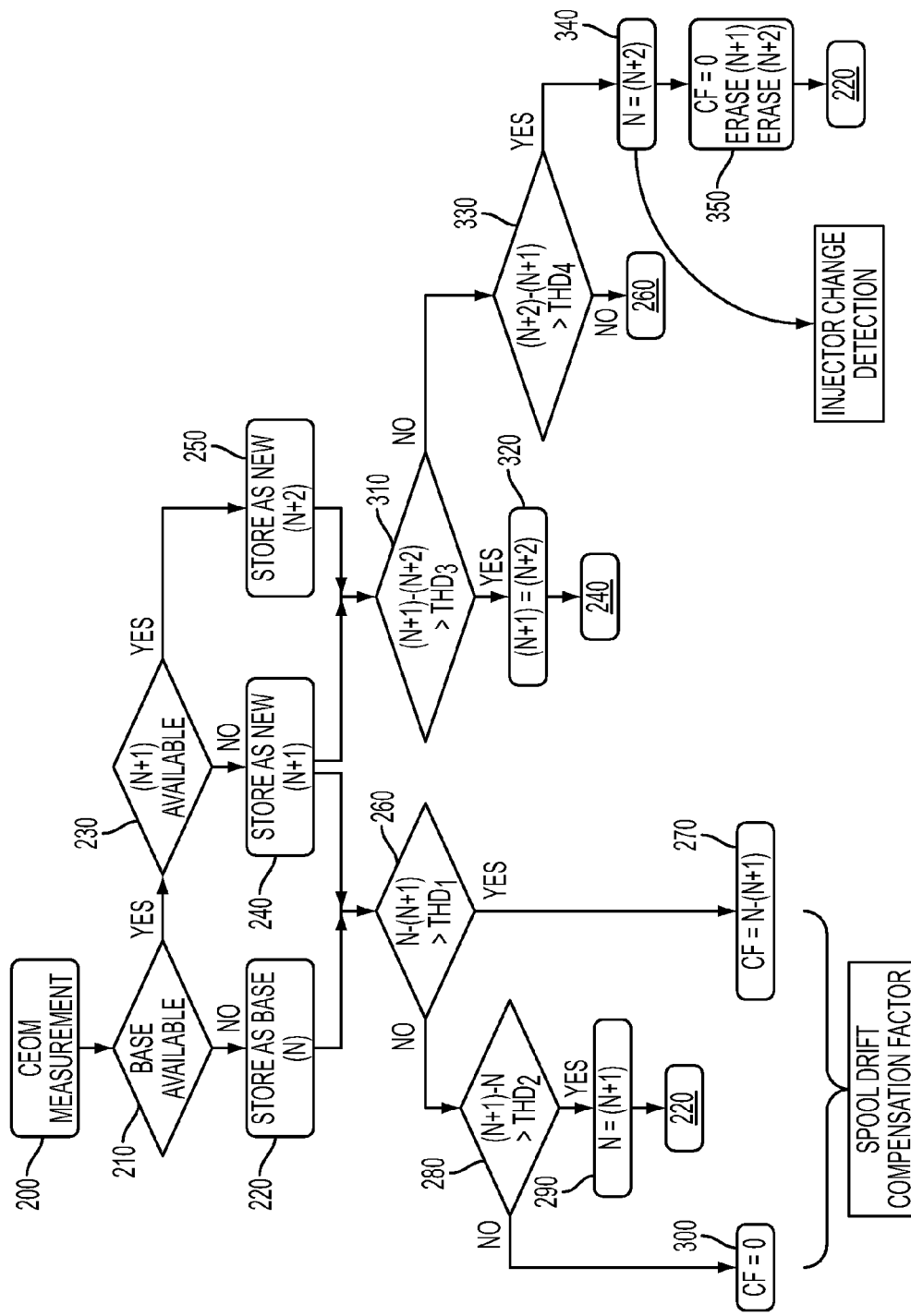
FIG. 6 is a flow chart showing compensation factor calculation and injector change detection in accordance with an embodiment.

With reference to FIG. 6, a flow chart shows how the controller C calculates a spool drift compensation factor or determines an injector change in service condition. In step 200, the CEOM time measurement is obtained using back EMF as explained above. In step 210, it is determined if a previously obtained base CEOM time measurement had been obtained. If not, the CEOM time measurement of step 200 is stored as N in step 220. If a base CEOM measurement is available, it is determined in step 230 if N+1 CEOM time measurement is available. If not, a new N+1 measurement is stored in step 240, and if so, a new N+2 measurement is stored in step 250. With regard to calculating the spool drift compensation factor CF, after steps 240 and 220 have occurred, it is determined by the controller C in step 260 if N−(N+1)>$THD_1$, with $THD_1$ being a first calibrated threshold. If yes, the compensation factor CF is set as N−(N+1) in step 270 and CF is applied to the injector duration (TI), and if no, in step 280, it is determined if (N+1)−N>$THD_2$, with $THD_2$ being a second calibrated threshold. If (N+1)−N>$THD_2$, then N is set to equal (N+1) in step 290 and the process continues to step 220. If (N+1)−N is not greater than $THD_2$, then CF=0 in step 300.

The flow chart of FIG. 6 also shows how the controller C detects an injector change in service (replacement) condition. Thus, after steps 240 and 250, it is determined in step 310 if (N+1)−(N+2)>$THD_3$, with $THD_3$ being a third calibrated threshold. If so, (N+1) is set to equal (N+2) and the process continues to step 240, and if not, it is determined in step 330 if (N+2)−(N+1)>$THD_4$. If (N+2)−(N+1) is not greater than $THD_4$, the process continues to step 260 and if (N+2)−(N+1) is greater than $THD_4$, N is set to equal (N+2) in step 340, which indicates an injector change in service condition and thus CF=0 in step 350.

In a hydraulically driven injector, the armature 112 moves in a viscous environment, and as such, the armature motion is affected by the pressure and viscosity of the surrounding fluid. To enable an accurate correction factor calculation, it is recommended to measure CEOM time above a certain temperature and pressure of the hydraulic medium surrounding the injector armature 112.

The CEOM time measurement can be accomplished at certain engine running intervals. The newest measurement can be then compared to the 'Zero' hour measurement to understand the reduction in injection duration due to faster armature movement in the close motion. The difference in CEOM time can then be used to compensate for the loss in injection duration.

Calibration thresholds (e.g., $THD_1$, $THD_2$, $THD_3$, $THD_4$) can be introduced for all measurements to ensure that the compensation factor is calculated only if the loss in injection duration is greater than a tolerance limit, and to avoid false injector change detections. For example, if a design engineer does not want a compensation factor to be applied for up to 10% faster spool motion, then the corresponding thresholds can be calibrated such that the compensation factor calculation happens only after the spool motion is faster by >10% as compared to the base measurement for new injectors. More particularly, in one embodiment, $THD_1$=0.2 ms, $THD_2$=0.1 ms, $THD_3$=0.1 ms, and $THD_4$=0.05 ms.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of ensuring that a certain amount of fuel is delivered by a fuel injector at each injection cycle over the life of the fuel injector, the fuel injector having an armature constructed and arranged to move between an open position and a close position, the method including:
    establishing a certain injection duration time of the fuel injector that ensures that a certain amount of fuel is delivered by the fuel injector,
    establishing a base time (N) for the armature to move from the open position to the close position,
    comparing a present time (N+1) for the armature to move from the open position to the close position to the base time (N), and
    if the present time is greater than the base time by a predetermined amount, then 1) setting a present injector duration time to be greater than the certain injector duration time to ensure that the certain amount of fuel is delivered by the fuel injector, or 2) indicating a change in service condition for the fuel injector.

2. The method of claim 1, wherein back electromagnetic force is used to establish the base time (N) and the present time (N+1).

3. The method of claim 1, further comprising:
    if N−(N+1)>$THD_1$, wherein $THD_1$ is a first threshold value; or if (N+1)−N>$THD_2$, wherein $THD_2$ is a second threshold value; or establishing another time (N+2) for the armature to move from the open position to the close position and if (N+1)−(N+2)>$THD_3$, wherein $THD_3$ is third threshold value, then setting a compensation factor to be N−(N+1) and applying the compensation factor to the certain injection duration time to establish the present injector duration time, or
    if (N+1)−N<$THD_2$, then setting the compensation factor to be zero, or
    if (N+2)−(N+1)>$THD_4$, wherein $THD_4$ is a fourth threshold value, indicating the change in service condition for the fuel injector.

4. The method of claim 3, wherein $THD_1$=0.2 ms, $THD_2$=0.1 ms, $THD_3$=0.1 ms, and $THD_4$=0.05 ms.

5. The method of claim 3, wherein back electromagnetic force is used to establish the base time (N), the present time (N+1) and the another time (N+2).

6. The method of claim 1, wherein the movement from the open position to the close position includes movement of the armature from an open electromagnetic coil to a close electromagnetic coil of the fuel injector.

* * * * *